United States Patent [19]

McKeon, Jr. et al.

[11] 3,868,296

[45] Feb. 25, 1975

[54] PLASTIC WALL CONSTRUCTION AS A WALL UNIT

[75] Inventors: Thomas F. McKeon, Jr., King of Prussia; George D. Meier, Phoenixville, both of Pa.

[73] Assignee: General Electric Company, Philadelphia, Pa.

[22] Filed: Apr. 27, 1973

[21] Appl. No.: 355,195

[52] U.S. Cl............... 161/43, 52/309, 52/361, 52/612, 161/44, 161/162
[51] Int. Cl...... B32g 13/02, E04f 13/04, E04c 1/04, E04b 2/04
[58] Field of Search............ 161/43, 160–162, 161/44; 52/612, 309, 361

[56] References Cited
UNITED STATES PATENTS

| | | | |
|---|---|---|---|
| 1,864,287 | 6/1932 | Welch | 52/612 X |
| 2,850,890 | 9/1958 | Rubenstein | 52/612 X |
| 3,736,715 | 6/1973 | Krumwiede | 52/309 |
| 3,763,614 | 10/1973 | Hyde et al. | 52/309 |

*Primary Examiner*—Philip Dier

[57] ABSTRACT

A cast plaster structural unit with a water impervious face is made by spraying or casting successively on a flat bed a layer of gel resin, a layer of fiber-reinforced resin, and a bonding layer of resin having wood chips admixed. Plaster is then cast upon the bonding layer, the irregular surface produced in the bonding layer by the protruding wood chips affording mechanical keying of the plaster. The resulting product is a strong plaster-faced structural unit having a back surface capable of withstanding exposure to moisture, and also serving as a moisture seal against any moisture presented to the plaster front face.

2 Claims, 1 Drawing Figure

PATENTED FEB 25 1975 3,868,296
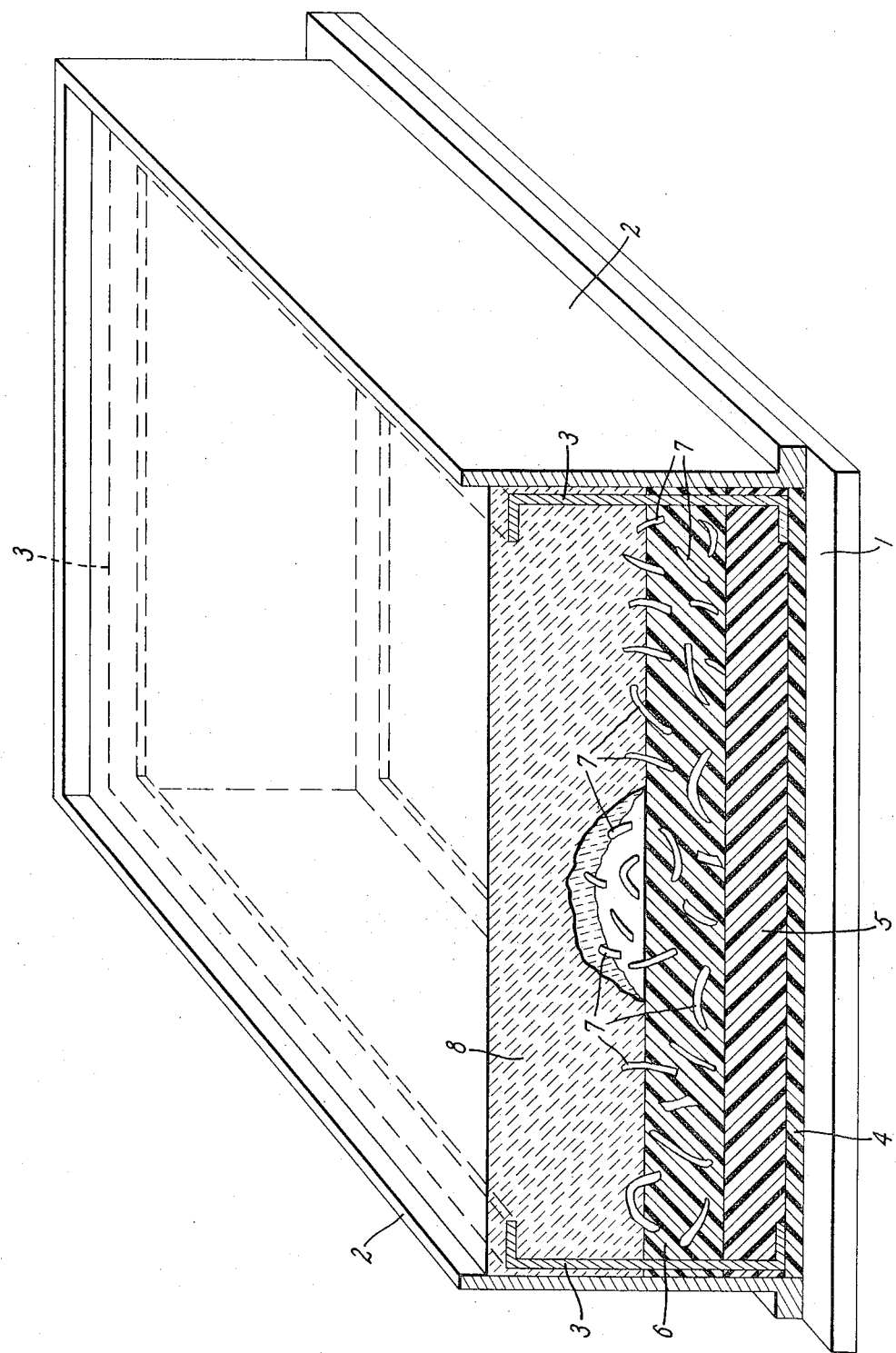

PLASTIC WALL CONSTRUCTION AS A WALL UNIT

CROSS REFERENCE TO RELATED APPLICATION

Ser. No. 155,765, filed June 23, 1971 for AUTOMATED CAST PLASTER BELT LINE by Blume, Biester, McCrea, Chapman, and Todd, assigned to the assignee of this application.

Ser. No. 260,999, filed June 8, 1972 now abandoned for IMPROVED PLASTER STRUCTURAL UNIT by McKeon and Tilli, assigned to the assignee of this application.

BACKGROUND OF THE INVENTION

1. Field of the Invention

This invention pertains to the making of plaster surfaced structural units, particularly wall units.

2. Description of the Prior Art

In conventional plaster wall construction, moisture protection is provided by a variety of means of differing cost, ranging from painting to ceramic or plastic cemented tile, the latter in the limiting size being plastic paneling. Dry wall construction of wall board panels attached to studs may, of course, employ panels of special moisture-resistant surface or total composition. Complete structural units for assembly by suitable framing and holding means into complete structures of which the units form the walls may be of cast concrete or other materials suited to resist moisture and other outside weather conditions; but concrete, even of quality which resists moisture, is unaesthetic in appearance for interiors of dwellings and, when subject to such wetting as from shower baths, tends to become permanently discolored. Concrete and cinder-block dwellings are in fact conventionally finished inside by various means. Simple reinforced cast plaster units, such as those described in the first referenced application, provide only a conventional gypsum surface, and require some internal support such as metal lath on frames. U.S. Pat. No. 3,232,017 teaches the production of a structural unit with plastic faces joined by rigid plastic foam, and decorative protrusions of partially embedded particles on a face to simulate masonry. This is, of course, rendered costly by the exclusive use of organic plastic in place of less expensive inorganic materials. In general, the nature of the art is such that, while the novelty and operativeness of an invention to produce a desirable result may be unquestioned, its practical adaptability may be governed by its cost.

SUMMARY OF THE INVENTION

A gel plastic facing is cast or sprayed upon a base of the desired product length and width, the base being smooth or of any patterning desired in the final product. Upon this a resin-glass fiber layer is applied as a reinforcing backing. Upon this a tie layer of resin is applied containing wood chips or coarse shavings which protrude from the surface. Upon the tie layer, and around the protruding chips, a layer of plaster of Paris is cast. The resulting product is a structural unit with one face of conventional plaster or synthetic gypsum (recognizing that gypsum is technically a natural mineral), and the other of a smooth plastic which, according to the choice of gel material, is resistant to moisture and may be impervious to outside weather environment in general. Because the internal resin-fiber glass provides structural strength, it is strong despite comparative lightness; the use of inexpensive wood chips provides strong bonding between the organic resin material and the inorganic plaster. The product may be cast into a metal frame which is left in place for support and mounting; or it may be parted from a surrounding enclosure into which it is cast, and provided with separate mountings.

BRIEF DESCRIPTION OF THE DRAWING

The sole drawing represents partially pictorially and cut away the product of my invention in the position in which the product is formed by the disclosed process.

DESCRIPTION OF THE PREFERRED EMBODIMENT

A base plate 1, which may be any convenient surface, plane and level, is provided with dams 2 to define the area of the product. These may be coated, prior to each production, with a thin coating of a parting compound effective for all the various materials (i.e. organic resins and plaster) employed. Silicone lubricants are commercially available in sprayable form and readily applicable in a thin but adequate coverage. A frame 3 is represented as a metal channel structure to be permanently included in the finished product. As has been indicated in the summary of the invention, the provision of frame 3 is optional. If included, it may be provided with any of a variety of conventional fastening means to facilitate fastening or mounting of the complete product. A first layer 4 of a resin gel formulation is cast or sprayed upon the base plate 1 within the dams 2, and allowed to cure or harden sufficiently that the frame 3 may be laid upon it without penetrating to base plate 1, in order that the gel face 4 will cover the product face completely. Gel 4 may be any of a number of commercially available resins of the general classes such as polyester or epoxy or similar types, and may be dyed or pigmented as desired. Fillers may be included for inexpensive extension of the more expensive resins, as well as to improve dimension stability. The addition of opaque fillers may also be beneficial in making the gel coating 4 less vulnerable to injury by radiation such as that of the sun, if the gel coat is intended ultimately to be exposed to external ambient conditions, as an outside wall of a structure. A suitable thickness for the gel coat 4 after curing is of the order of 0.010 inches.

Upon gel coat 4 there is applied a reinforced resin coat 5. This may economically be a formulation with admixed glass fibers in lengths in the range of approximately one-fourth to 1 inch; or, somewhat more expensively, it may be reinforced with cloth of glass fibers of proper dimensions. The firm adherence obtainable between adjacent layers of organic resins, and the possibility of intimately mixing individual glass fibers in the formulation of resin coat 5 provide means to secure adequate strength for most structural purposes by the simpler use of admixed glass fibers. It does not appear that for ordinary structural purposes the use of glass fiber cloth, which would require hand labor for its application, can be justified. A formulation with admixed glass fibers may be sprayed or cast, a much more economical procedure readily adaptable to automatic processing. Epoxy resins are conventionally applied to glass fibers or cloth in e.g. boat construction and may be employed here, although obviously other available resin formulations (such as polyester) might be employed if cost or other considerations rendered them preferable. The final thickness of layer 5 may suitably be 0.020 to 0.040 inches.

To reinforced resin coat 5 there is now applied, conveniently by casting, a resin formulation 6 containing admixed wood chips or coarse shavings 7. A suitable thickness for the ultimate thickness of formulation 6 is 0.20 to 0.50 inches, or greater if desirable. Since the function of chips 7 is to protrude out of the surface of 6 to furnish a large density of ties or irregularities to bond plaster layer 8, it is desirable that they be of the order of one-fourth to one-half inch wide, and have a developed length, when flattened out forcibly, of the order of an inch. The chips considered preferable are the partially curled chips produced by the operation e.g. of a smoothing planer operating to smooth planks. Their thickness may be expected to be of the order of 0.030 to 0.060 inches. It must be emphasized that these dimensions are by no means critical, and are intended rather to indicate the general category or grade of inexpensive commercially available material which is still used for such routine purposes as packing bottles of chemicals or absorbing spilled liquids. Ordinary sawdust would be too fine to produce adequate anchorage; excessively long, wide, or thick chips would be difficult to distribute with adequate uniformity.

The resin employed for the formulation of resin coat 6 may be in the general classes of polyester, polyurethane, epoxy and similar types of castable resins. The proportion of wood chips to resin solids may be of the order, by weight, of 80–85 percent. It should be as high as is consistent with complete wetting of the wood chips 7 by the formulation prior to casting, to provide maximum roughness and consequent bonding of plaster layer 8.

After the resin formulation 6 has cured sufficiently to prevent its disturbance by the application of plaster layer 8, plaster layer 8 is applied. Plaster layer 8 is generically a conventional formulation of the kind used as finishing coatings for walls, and is applied as a slurry by casting. In application it surrounds the protrusions formed by the chips 7 for which purpose vibration may be applied, optionally, to 1; and when hardened, it is bonded at a multiplicity of places to the layer 6. This is a very useful result, as it is usually difficult to secure adhesion of plaster to resin. Plaster layer 8 will ordinarily be made sufficiently thick to cover frame 3, as represented in the drawing.

After the various components have cured and hardened, the product (items 3 (if used), 4, 5, 6, 7, and 8) may be removed from base plate 1 and dams 2. It constitutes a structural unit having a moisture-resistant face 4 on one side, and a conventional plaster face 8 on the other. It is rendered strong by the fiber-glass reinforced layer 5.

While the use of structural units of this general nature is old in the art, it may be noted that the product of this invention is particularly well adapted for; internal use with its moisture-resistant face 3 forming the walls of a bathroom or kitchen, with its plaster face 8 exposed in unspecialized dwelling rooms; and for external exposure with its moisture-resistant face 3 forming the outside wall surface and its plaster face 8 exposed on the inside. While the absence of insulation might restrict its external use in cold climates, its relative lightness and cheapness would recommend it for use in warm climates or in vacation homes or other buildings not intended for cold-weather occupancy.

What is claimed is:

1. A structural unit of general nature of a wall panel comprising:
   a. a first exposed layer of water-resistant organic resin;
   b. a second layer of glass-fiber reinforced organic resin having one face adhered to said exposed first layer of water-resistant organic resin;
   c. a third layer of organic resin having one face adhered to said layer of glass-fiber reinforced organic resin, and containing inclusions of wood chips protruding from a face remote from said adhered face to provide an irregular surface configuration;
   d. a fourth layer of plaster having one face adjacent to said third layer of organic resin intimately surrounding said protruding wood chips, and having a mechanical bond between said fourth layer of plaster and said protruding wood chips.

2. The structural unit recited in claim 1 further comprising:
   e. a metal frame passing through said second layer of glass-fiber reinforced organic resin and said third layer of organic resin, and having one end placed on said exposed first layer and having an opposite end extending into said fourth layer of plaster, and said metal frame extending substantially around the periphery of said structural unit.

* * * * *